Jan. 17, 1950

W. F. FORRESTER ET AL 2,494,699

MANUFACTURE OF DIELECTRIC MATERIALS

Filed Jan. 7, 1948

2 Sheets-Sheet 1

Invent
WILLIAM FRANCIS FORRES
ROBERT MALCOLM HINDE
BELA SZIGETI
Stevens, Blanks & Webb Attorn

MANUFACTURE OF DIELECTRIC MATERIALS

Filed Jan. 7, 1948 2 Sheets-Sheet 2

Inventors
WILLIAM FRANCIS FORRESTER
ROBERT MALCOLM HINDE &
BELA SZIGETI
By Stebbins Blenko & Webb Attorneys Patented Jan. 17, 1950 2,494,699

UNITED STATES PATENT OFFICE 2,494,699

MANUFACTURE OF DIELECTRIC MATERIALS

William Francis Forrester, Glasgow, Scotland, and Robert Malcolm Hinde, Huyton, near Liverpool, and Bela Szigeti, Clifton, Bristol, England, assignors to British Insulated Callender's Cables Limited, London, England, a British company Application January 7, 1948, Serial No. 832
In Great Britain December 17, 1946

Section 1, Public Law 690, August 8, 1946
Patent expires December 17, 1966

7 Claims. (Cl. 25—156)

Figure 1:
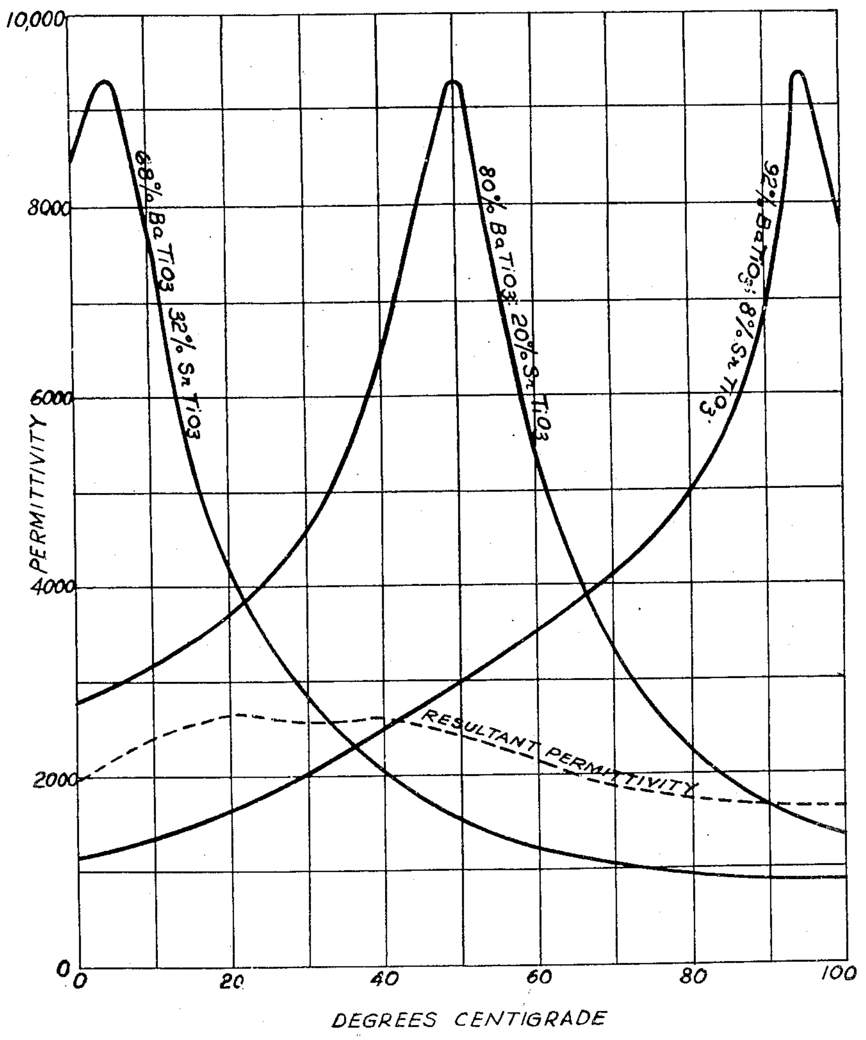

This invention relates to the manufacture of ceramic materials having high permittivity (specific inductive capacity) suitable for use in capacitors. In this manufacture we utilize certain alkaline earth titanates in solid solutions. A solid solution of barium titanate and strontium titanate, when formed into a dense ceramic body, has a very high permittivity, greater than 5,000 but limited to a narrow range of temperature of the order of five degrees centigrade. The position on the temperature scale of this narrow peak is dependent upon the relative proportions of the two constituent titanates. Such material is of a limited practical value in technical applications, for instance in capacitors, since the narrow range of temperature at which the valuable property exists in much smaller than the working temperature range of technical apparatus in which the dielectric would be normally employed.

For use in capacitors and other technical apparatus it is necessary, or desirable, that the dielectric material should have a fairly constant permittivity over a considerable temperature range covering the possible working conditions. This range may have an extent of 100 to 120 degrees centigrade for instance from −40° C. to +80° C. or from 0° C. to 100° C.

By the present invention these requirements are complied with. In accordance with it we prepare a number, say from 3 to 5, of components each consisting of the two alkaline earth titanates above mentioned in solid solution but differing in the proportions of their constituents so that the peak of permittivity of each is at a different temperature from that of the others, these peaks being distributed over the required practical temperature range. We then convert a selection of these components in powder form in appropriate proportions into an integral body by a process including heat treatment of less intensity than would cause the constituents to interact and lost their individual structures and form a more or less homogeneous single solid solution in which the desired uniform high permittivity is not present. (This effect is dependent on both the temperature and the time of duration of the heat treatment and "intensity" includes these factors in combination.) In this way a dielectric material is produced in which, while the value of permittivity is, at any temperature in a range, much below the peak value obtainable by a single constituent, it has a value throughout the practical temperature range sufficiently high (for instance 1,000 to 2,000) to be very advantageous and at the same time has a deviation from the mean which does not exceed practical requirements. The components are combined without the use of additional material to serve as a binding medium. Dilution of the permittivity due to the presence of such an addition is therefore avoided.

In one method of converting the components selected into an integral body each of the solid solutions is formed into a thin layer by pressure, and the layers are pressed together and fired, the firing temperature being such that the layers sinter together. This causes some diffusion of the layers into each other, but by the choice of appropriate firing conditions the interaction is controlled so as to obtain a dense ceramic body of sufficiently graded composition to give the desired final characteristics. Suitable firing conditions approximate to 1300° C. for twelve hours.

In another method the layers of the individual basic solid solutions are fired separately and are then refired in contiguity to provide a composite body. This reduces the intensity of the action of firing of the composite body. The conditions for firing the separate layers will be from 1300 to 1350° C. for twelve hours and the final firing of the composite body will be from 1250° to 1300° C. for one hour.

Figure 2:
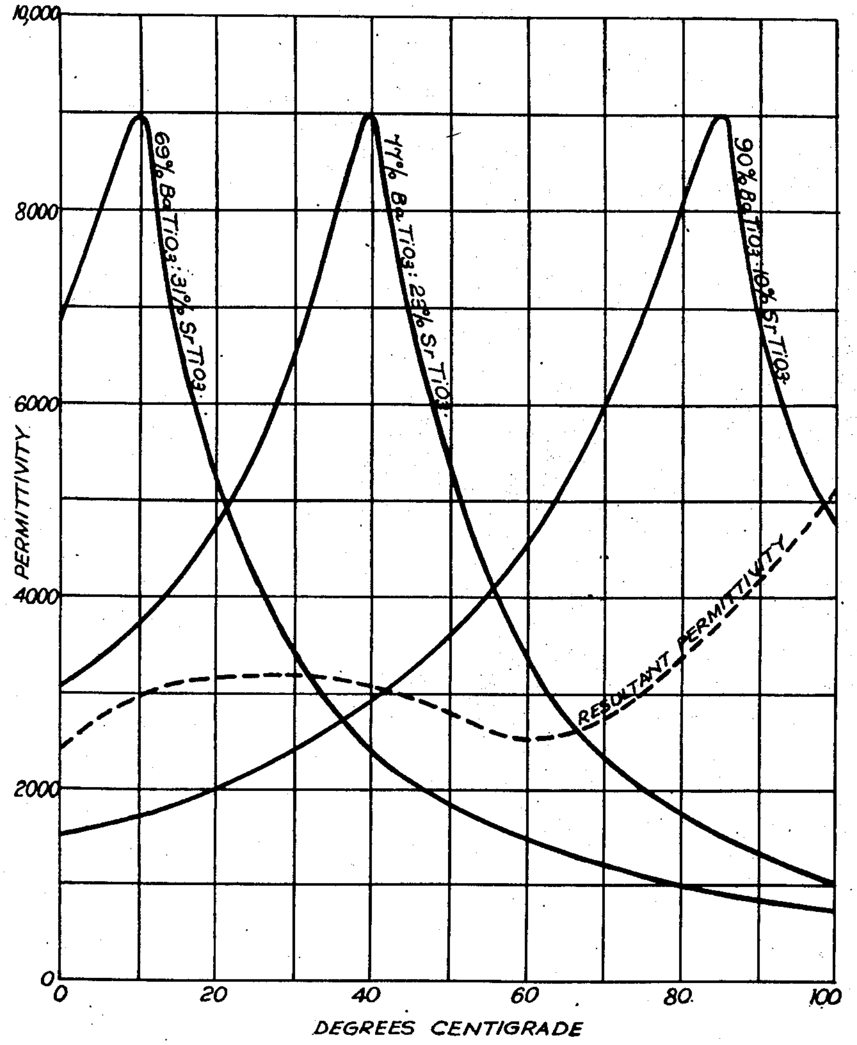

The relationship between the properties of the three components and bodies formed from them in the manner of the invention is illustrated, by way of example, in the accompanying curves, Figures 1 and 2.

In the body represented by Figure 1, the three components have the following percentage compositions by weight.

| | A | B | C |
|---|---|---|---|
| Barium titanate | 92 | 80 | 68 |
| Strontium titanate | 8 | 20 | 32 |

The three components have a peak permittivity of about 9,000 at 95°, 50° and 5° C. respectively. A fired body utilising the three components in the proportion 40% by volume of A, 20% of B and 40% of C exhibits a resultant overall permittivity within the range of 1,600 to 2,800 at temperatures between 0° and 100° C., as illustrated by the broken line in Figure 1.

In the second example represented in Figure 2, the percentage compositions of the three components are as follows:

| | D | E | F |
|---|---|---|---|
| Barium titanate | 69 | 77 | 90 |
| Strontium titanate | 31 | 23 | 10 |

The peak permittivity in each case is about 9,000, occurring in the three instances at 10°, 40° and 85° C. respectively. A fired body utilising the three components in the proportion of 40% by volume of D, 15% of E and 45% of F exhibits a resultant overall permittivity within the range of 2400–5100 at temperatures between 0° and 100° C. as illustrated by the broken line in Figure 2. It will be seen that over the range of temperature from 0° to 80° C., the resultant permittivity is from 2,400 to 3,400.

An example of a method of manufacture of the resultant body is as follows. The individual titanates are ground finely enough to pass a sieve of 300 mesh per square inch. Each component is then prepared with the required proportions of barium and strontium titanates. Each of the components is then granulated by the addition of 10% by volume of water and passage through a sieve of 20 mesh per square inch. The required proportions of each component are poured in sequence into a die. After the pouring of each component, pressure is applied to consolidate the powder. After the final pressing operation the composite body is fired at about 1300° C. for 12 hours. In order to ensure equality in the measure of shrinkage throughout the composite body, the individual components may be precalcined. Alternatively, for the same purpose the several components may be arranged to have different particle sizes.

According to the other method each of the three layers is consolidated and fired separately at 1300° C. for 12 hours. Before placing the layers together the faces may be ground flat to ensure that when they are brought together there will be intimate contact between the adjacent surfaces. The composite body is again fired at 1250° C. for one hour to obtain the required union between the contacting surfaces. The accompanying graph is representative of the properties of the composite body obtained by either method.

What we claim as our invention is:

1. A method of manufacture of a ceramic body, comprising forming three solid solutions of barium and strontium titanates having respectively the proportions 92% $BaTiO_3$/8% $SrTiO_3$, 80% $BaTiO_3$/20% $SrTiO_3$, and 68% $BaTiO_3$/32% $SrTiO_3$ by weight, reducing the said solid solutions to powder, and combining 40%, 20% and 40% by volume respectively of the powdered solid solutions into an integral body by heat treatment without destroying the identities of the said solid solutions.

2. A method of manufacture of a ceramic body, comprising forming three solid solutions of barium and strontium titanates having respectively the proportions 69% $BaTiO_3$/31% $SrTiO_3$;
77% $BaTiO_3$/23% $SrTiO_3$, and 90% $BaTiO_3$/10% $SrTiO_3$ by weight, reducing the said solid solutions to powder, and combining 40%, 15% and 45% by volume respectively of the powdered solid solutions into an integral body by heat treatment without destroying the identities of the said solid solutions.

3. A method of manufacture from barium and strontium titanates of a ceramic body having a high permittivity between predetermined maximum and minimum values over a desired temperature range, comprising forming from the said titanates at least two solid solutions each having proportions of the said titanates different from the proportions in any other of the said solutions and each having its maximum permittivity at a temperature different from the temperature for maximum permittivity of any other of the said solutions, each of said temperatures being within the desired temperature range, reducing the said solid solutions to powder, and combining portions of the powdered solid solutions into an integral body by heat treatment, without destroying the identities of the said solid solutions.

4. A method of manufacture from barium and strontium titanates of a ceramic body having a high permittivity between predetermined maximum and minimum values over a desired temperature range, comprising forming from the said titanates at least two solid solutions each having proportions of the said titanates different from the proportions in any other of the said solutions and having its maximum permittivity at a temperature different from the temperature for maximum permittivity of any other of the said solutions, each of said temperatures being within the desired temperature range, reducing the said solid solutions to powder, forming a portion of each powdered solid solution into a layer, compressing the layers together and uniting the layers by heating without destroying the identities of the said solid solutions.

5. A method of manufacture from barium and strontium titanates of a ceramic body having a high permittivity between predetermined maximum and minimum values over a desired temperature range, comprising forming from the said titanates at least two solid solutions each having proportions of the said titanates different from the proportions in any other of the said solutions and having its maximum permittivity at a temperature different from the temperature for maximum permittivity of any other of the said solutions, each of said temperatures being within the desired temperature range, reducing the said solid solutions to powder, forming an amount of each powdered solid solution into a layer, firing each layer, compressing the layer together and uniting the said layers by heat treatment without destroying the identities of the said solid solutions.

6. A method of manufacture as claimed in claim 4 wherein the heating is maintained at 1250°–1350° C. for twelve hours.

7. A method of manufacture as claimed in claim 5, wherein each separate layer is fired at 1300°–1350° C. for twelve hours and the final heating is at 1250°–1300° C. for one hour.

WILLIAM FRANCIS FORRESTER.
ROBERT MALCOLM HINDE.
BELA SZIGETI.

REFERENCES CITED

The following references are of record in the file of this patent:

UNITED STATES PATENTS

| Number | Name | Date |
|---|---|---|
| 1,688,422 | Hyde | Oct. 23, 1928 |
| 1,727,580 | White | Sept. 10, 1929 |
| 1,852,676 | Ross et al. | Apr. 5, 1932 |
| 2,193,635 | Marshall | Mar. 12, 1940 |
| 2,420,692 | Wainer | May 20, 1947 |
| 2,443,211 | Wainer et al. | June 15, 1948 |